Nov. 21, 1950 — A. STEINBERG — 2,531,237
DEVICE FOR PROCESSING YOGURT
Filed March 7, 1946
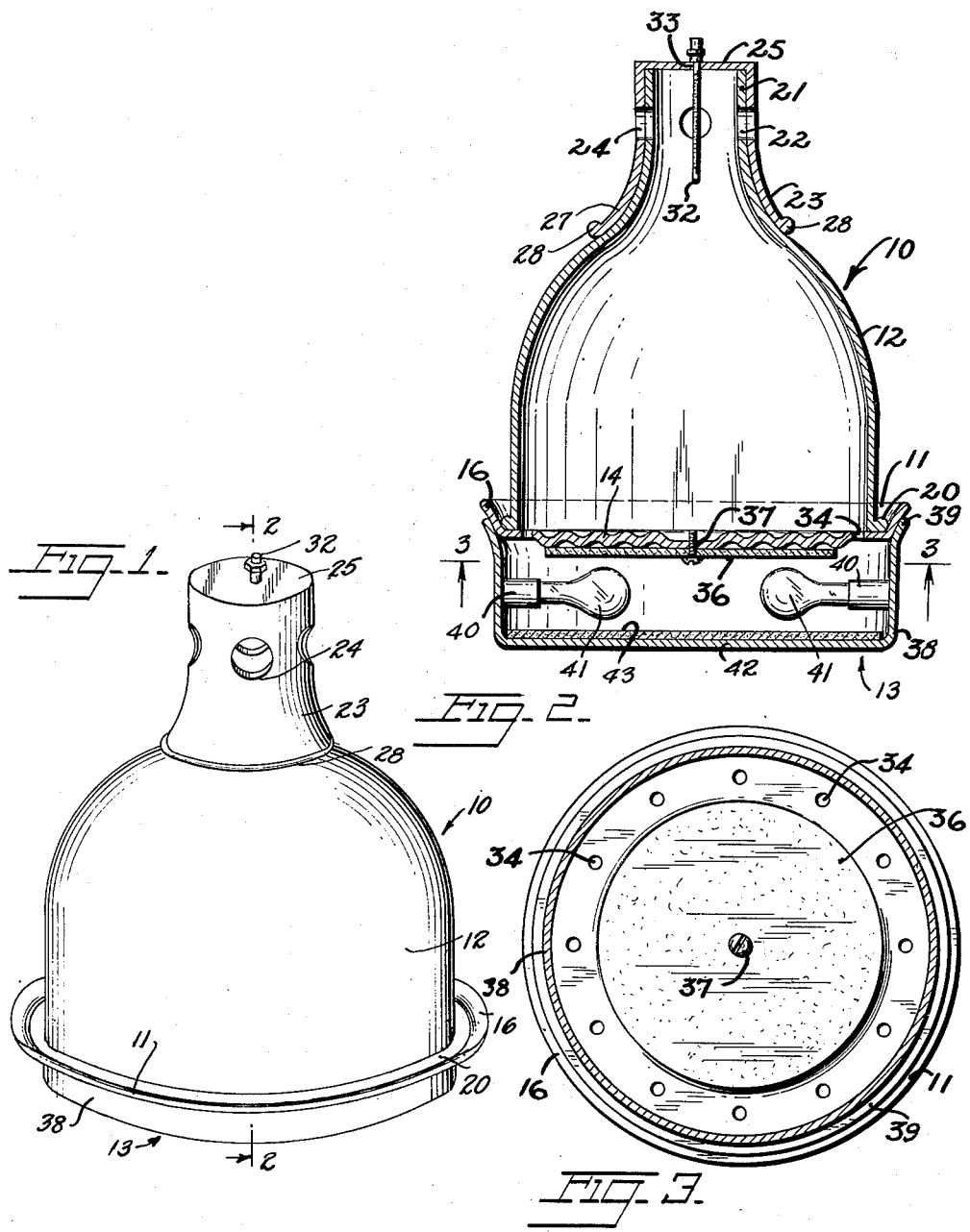
INVENTOR
ALEXANDER STEINBERG
By
ATTORNEY Patented Nov. 21, 1950

2,531,237

UNITED STATES PATENT OFFICE 2,531,237

DEVICE FOR PROCESSING YOGURT

Alexander Steinberg, New York, N. Y.

Application March 7, 1946, Serial No. 652,835

2 Claims. (Cl. 126—275)

This invention relates to containers and more specifically to one in which the parts can be separated for the convenient processing of yogurt.

A particular object of the invention is to provide a container which can be rapidly heated in the interior thereof to evenly heat a number of containers therein, and to provide tray and cover members in close fitting association so that the contents are maintained in a sanitary condition and so that the maximum degree of heat may be utilized.

Other important objects of the invention are to provide means for supporting a thermometer in the cover of the device so that it may accurately show the temperature at the center of the container; to provide a cap member which may be revolved to open and close the container for ventilating the same; to provide a container for home use or for industrial use, so constructed that a greater degree of heat may be applied to the interior of the container without direct application of the heat to the yogurt containers and to provide a container of the character referred to which is devoid of crevices, fastening elements or the like which would harbor dirt or other contaminating foreign matter and one which can be readily cleaned and maintained in a sanitary condition.

For further comprehension of the invention, and of the objects and advantages thereof, reference will be had to the following description and accompanying drawings, and to the appended claims in which the various novel features of the invention are more particularly set forth.

In the accompanying drawing forming a material part of this disclosure:

Fig. 1 is a view in perspective of a container embodying the invention.

Fig. 2 is a vertical sectional view taken on the line 2—2 of Fig. 1.

Fig. 3 is a transverse sectional view taken on the line 3—3 of Fig. 2.

The device for processing yogurt, according to the present invention, includes a container 10 having a tray 11, a cover 12 and a heat producing means 13.

The tray 11 is formed with a concentrically corrugated section 14 and at its periphery it is provided with a rounded upwardly and outwardly extending flange 16.

The cover 12 is shaped in the form of a dome and is provided about its lower edge with a bead 20 which helps to seal the lower edge of the cover where it rests on the tray. The upper part of the cover 12 is provided with an extended open neck portion 21 having side openings 22 therein which are arranged to be closed by a cap 23 fitting closely about said neck 21 and being also provided with side openings 24 which may register with the holes 22 to provide a ventilating means in the device. The lower edge of the cap 23 is flared as at 27 and is provided with an edge bead 28 for the purpose of strengthening the cap. The cover 12 is arranged to extend over containers which are to be placed on the tray 11 and in which the yogurt is processed, the latter being supported on the corrugated surface of the tray, the corrugations of which provide for the circulation of air beneath the containers. During the processing the cap is closed so the interior of the device is quickly heated and then the cap is revolved to bring the openings 22 and 24 into register to prevent condensation in the interior of the device.

The cap 23 is formed with a closed top 25 which is provided with a thermometer opening 33 through which there extends a thermometer 32. The tray 11 is provided with peripheral perforations 34 adjacent the inside edge of the cover 12. At the center of the concentrically corrugated tray 11 and abutting the underside thereof, a heat insulating disc 36 is provided which is attached to the tray in any suitable manner such as by the screw 37.

The heat producing means 13 comprises a pan 38 having the upper edges thereof flared as at 39 is arranged to support the flange 16 of the tray 11. The vertical wall of the pan supports the electric light sockets 40 in which electric light bulbs 41 are positioned to furnish heat to the underside of the tray 11. The bottom wall 42 of the pan being insulated as at 43.

As uniformly warm temperatures can be easily retained within the container 10 it is admirably suited to be used in the making of certain foods such as yogurt and other substances which require processing for considerable periods of time at definite warm temperatures.

For home use, the tray 11 may have fewer perforations than would a larger unit employed for industrial use and the inside surface as well as the exterior of the device is highly polished to reflect light rays. It is evident that the invention contemplates a structure in which a uniform temperature may be maintained for any predetermined period of time. The heat may be distributed by a bulb, with or without the use of a thermostat which can be used to vary the temperature inside the container so that it would not be necessary to change the electric bulb of one wattage for others of a greater or lesser wattage, it being evident that the thermostat, if one was employed, could be placed on the side of the container.

It is evident, therefore, that a device of simple construction is provided in which there are no sharp corners, crevices or other connecting means that would contribute to the contamination of the milk or food in incubation. The parts of the device are quickly and easily separated for complete cleaning. The thermometer 32 is so placed as to give temperature in the center of the tray and readily slides in and out of the cover 12 for temperature readings. The device is adapted for home use in the processing of yogurt and for keeping food, dishes or bottles warm or hot.

The annularly arranged perforations 34 in the tray 11 allow the heat to rise from the pan 38 into the cover 12 and the insulating disc prevents the yogurt containers from becoming heated in a greater degree at the bottom, it being understood that even heat is essential to the proper processing of the yogurt. Any number of yogurt containers may be accommodated, it not being necessary that the containers touch each other as is necessary for some types of the device heretofore used. In this device the heat is derived from the heating unit and not from the other containers. In practicing the process, the device is plugged into a convenient electrical outlet and the interior heated with the cap revolved to close the holes. In about two minutes the milk is heated to about 110 degrees and is then poured into pans or containers to each of which about a teaspoon of culture is added. Then the containers are placed on the tray, the cover is placed thereover and the cap is revolved to open the holes. In about three and one half hours, the current is turned off and yogurt is removed for refrigeration.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:

1. In a cooking device, a pan forming a base and having an outwardly flared upper rim and a heat insulating plate on its bottom, a heating device in said pan, a substantially flat tray having an annularly corrugated center portion and an outwardly and upwardly extending peripheral flange, said tray fitting within said pan with their flanges in nested and close fitting relationship, a heat insulating plate on the under face of said tray, said tray having therein an annularly arranged row of apertures intermediate the heat insulating plate thereon and its outwardly and upwardly extending peripheral flange.

2. In a cooking device, a pan forming a base and having an outwardly flared upper rim and a heat insulating plate on its bottom, a heating device in said pan, a substantially flat tray having an annularly corrugated center portion and an outwardly and upwardly extending peripheral flange, said tray fitting within said pan with their flanges in nested and close fitting relationship, a heat insulating plate on the under face of said tray, said tray having therein an annularly arranged row of apertures intermediate the heat insulating plate thereon and its outwardly and upwardly extending peripheral flange, and a dome shaped cover having a circumferential bead at its base adapted to fit within the outwardly and upwardly extending flange on the tray with the base of the cover spaced outwardly of the annularly arranged row of apertures in said tray.

ALEXANDER STEINBERG.

REFERENCES CITED

The following references are of record in the file of this patent:

UNITED STATES PATENTS

| Number | Name | Date |
|---|---|---|
| 86,428 | Loomis | Feb. 2, 1869 |
| 514,575 | Turner | Feb. 13, 1894 |
| 560,116 | Watrous | May 12, 1896 |
| 626,219 | Castle | June 6, 1899 |
| 679,928 | Warren | Aug. 6, 1901 |
| 861,297 | Lewis | July 30, 1907 |
| 1,723,413 | Drehmann | Aug. 6, 1929 |
| 1,725,521 | Keiner | Aug. 20, 1929 |
| 1,768,172 | Triplett | June 24, 1930 |
| 2,001,615 | Karten | May 14, 1935 |
| 2,052,253 | Savary | Aug. 25, 1936 |
| 2,160,764 | Taylor | May 30, 1939 |
| 2,269,874 | Henschel | Jan. 13, 1942 |